United States Patent
Martinsen

(10) Patent No.: US 9,634,919 B2
(45) Date of Patent: Apr. 25, 2017

(54) MULTIPATH DATA STREAM OPTIMIZATION

(71) Applicant: Cisco Technology, Inc., San Jose, CA (US)

(72) Inventor: Pål-Erik Martinsen, Aas (NO)

(73) Assignee: Cisco Technology, Inc., San Jose, CA (US)

( * ) Notice: Subject to any disclaimer, the term of this patent is extended or adjusted under 35 U.S.C. 154(b) by 218 days.

(21) Appl. No.: 14/317,553

(22) Filed: Jun. 27, 2014

(65) Prior Publication Data

US 2015/0381455 A1  Dec. 31, 2015

(51) Int. Cl.

| G01R 31/08 | (2006.01) |
|---|---|
| G06F 11/00 | (2006.01) |
| G08C 15/00 | (2006.01) |
| H04J 1/16 | (2006.01) |
| H04J 3/14 | (2006.01) |
| H04L 1/00 | (2006.01) |
| H04L 12/26 | (2006.01) |
| H04L 12/707 | (2013.01) |
| H04N 19/00 | (2014.01) |

(Continued)

(52) U.S. Cl.
CPC ........ *H04L 43/0882* (2013.01); *H04L 43/062* (2013.01); *H04L 43/10* (2013.01); *H04L 45/22* (2013.01); *H04L 45/24* (2013.01); *H04L 65/608* (2013.01); *H04L 65/80* (2013.01); *H04L 69/14* (2013.01); *H04N 19/00* (2013.01); *H04N 19/39* (2014.11)

(58) Field of Classification Search
CPC ....... H04L 45/22; H04L 45/24; H04L 43/062; H04L 43/0882
See application file for complete search history.

(56) References Cited

U.S. PATENT DOCUMENTS

| 8,619,584 B2 | 12/2013 | Dhar et al. |
|---|---|---|
| 8,630,291 B2 | 1/2014 | Shaffer et al. |
| 2002/0150041 A1 | 10/2002 | Reinshmidt et al. |

(Continued)

FOREIGN PATENT DOCUMENTS

| EP | 0984633 B1 | 1/2004 |
|---|---|---|

OTHER PUBLICATIONS

A. Ford et al., Architectural Guidelines for Multipath TCP Development, Mar. 2011, RFC 6182, Internet Engineering Task Force (IETF).

(Continued)

*Primary Examiner* — Derrick Ferris
*Assistant Examiner* — Farhad Ali
(74) *Attorney, Agent, or Firm* — Lempia Summerfield Katz LLC

(57) ABSTRACT

In one implementation, a source endpoint and a destination endpoint communicate using multipath. A data stream may be transmitted using a primary path. The source endpoint and the destination endpoint connect through an alternative path, but before portions of the data stream are transmitted using the alternative path, the alternative path is tested using one or more disposable packets. The source endpoint sends the disposable packet of the data stream using the alternative path to the destination path and receives a transmission parameter for the disposable packet of the data stream and the alternative path.

18 Claims, 8 Drawing Sheets

(51) Int. Cl.
*H04L 29/06* (2006.01)
*H04N 19/39* (2014.01)

(56) References Cited

U.S. PATENT DOCUMENTS

| | | |
|---|---|---|
| 2006/0274718 A1 | 12/2006 | Butenweg et al. |
| 2012/0147742 A1 | 6/2012 | Kitamori et al. |
| 2012/0311173 A1* | 12/2012 | Agarwal ............ H04L 43/0829 709/231 |
| 2014/0036999 A1* | 2/2014 | Ryu .................. H04N 19/50 375/240.12 |
| 2014/0153409 A1 | 6/2014 | Bucko et al. |

OTHER PUBLICATIONS

A. Ford et al., TCP Extensions for Multipath Operation with Multiple Addresses, Oct. 20, 2013, Internet Engineering Task Force.
C. Holmberg et al., Negotiating Media Multiplexing Using the Session Description Protocol (SDP), Apr. 23, 2014, Internet Engineering Task Force.
Cisco ClearPath Whitepaper, Aug. 2012, Cisco.
Itu-T H.264, ITU-T Recommendations, May 2003, ITU.
P. Amer, Load Sharing for the Strea Control Transmission Protocol (SCTP), Mar. 19, 2014, Internet Engineering Task Force.
V. Singh et al., Multipath RTP (MPRTP), Jul. 14, 2013, Internet Engineering Task Force.
V. Singh et al., Multipath RTP (MPRTP), Jan. 11, 2013, AVT Core Working Group.
V. Singh et al., Multipath RTP (MPRTP), Jan. 13, 2014, Internet Engineering Task Force.
International Search Report and Written Opinion, from PCT/US2015/037655, Sep. 14, 2015, WO.

* cited by examiner

MULTIPATH DATA STREAM OPTIMIZATION

TECHNICAL FIELD

This disclosure relates in general to the field of multipath data traffic, and more particularly, to testing an alternative path for data traffic using a particular type of data packet or data frame.

BACKGROUND

The transmission control protocol (TCP) has undergone countless revisions, improvements, and upgrades. However, the core concept, that a connection between two hosts is singular, has remained unchanged for a majority of communications. The packets are turned over to the routers to take multiple routes to the destination, but in TCP there is only a single connection between the two hosts. Recent strategies have been developed to take advantage of multiple TCP connections. For example, two TCP connections may provide parallel paths between hosts.

The addition of parallel paths between hosts introduces additional issues, which may be complicated when different portions of a media stream are transmitted across the parallel paths. If one of the paths is faster than the other, problems may arise in reconstructing the stream. If one of the paths is transient or has recently become available, no existing mechanisms provide a test for the new path without disrupting the media stream transmission on the existing path.

BRIEF DESCRIPTION OF THE DRAWINGS

Example embodiments of the present embodiments are described herein with reference to the following drawings.

DESCRIPTION OF EXAMPLE EMBODIMENTS

Overview

Figure 1:
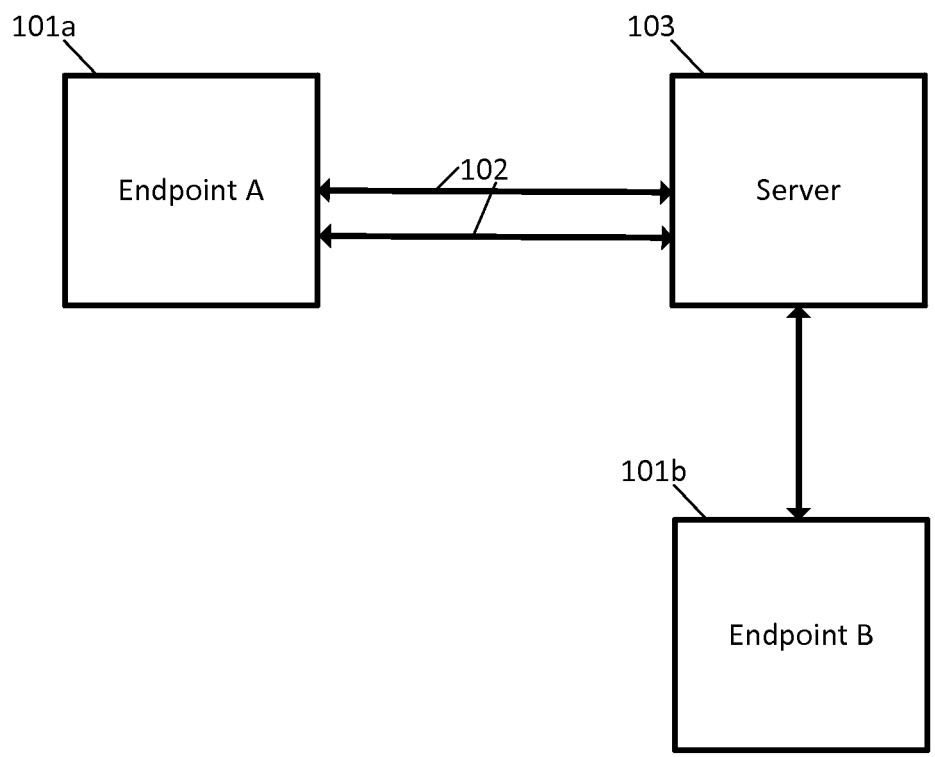
FIG. 1 illustrates an example system for testing a new path in multipath communication.

In one implementation, a method includes connecting, using a processor, to a destination through a primary path, sending a data stream using the primary path, connecting, using the processor, to the destination through an alternative path, sending a disposable packet of the data stream using the alternative path, and receiving a transmission parameter for the disposable packet of the data stream and the alternative path.

In another implementation, an apparatus includes a first communication interface configured to establish a first communication path to a destination and a second communication interface configured to establish a second communication path to the destination. A processor is configured to send a media stream over the first communication path and extract a disposable frame from the media stream to test communication over the second communication path.

In another implementation, a medium includes instruction to receive a media stream including intraframes through a primary path, receive at least one interframe of the media stream through a secondary path, generate a performance report for the secondary path, wherein the performance report include a transmission parameter based on the at least one interframe, and receive additional portions of the media stream through the secondary path when the transmission parameter exceeds a threshold value.

Example Embodiments

A data stream includes a series of packets. The data stream may be a media stream including video, audio, or both audio and video. A video stream may be a series of images. For example, a series of images at about 24 frames per second appears to be a fluid moving video to the human eye. Substantial bandwidth is required to transmit each frame of the video as completely independent images. Video compression may be used to reduce the size of the video. Video compression may use common elements from one frame to the next. For example, if an object appears in frame (n) at one position then moves slightly to a different position in frame (n+1), then the entire image does not need to be transmitted in both frames. Instead, frame (n+1) may only store the new location of the object. In addition, some objects may remain stationary, in which case frame (n+1) may only include data that indicates there is no change from the preceding frame.

In one example, frames that are independent and not based on any other frame may be referred to as intraframes, and frames that are expressed, at least in part, in terms of one or more neighboring (e.g., adjacent) frames may be referred to as interframes. Interframes that are expressed entirely based on one or more neighboring frames may be referred to as fully disposable frames. Fully disposable frames may be lost or rebuild without end user noticeable impact.

Interframes, in which up to 50% of the frame may be expressed in terms of one or more neighboring frames, may be referred to as minor disposable frames. Interframes, in which more than 50% of the frame may be expressed in terms of one or more neighboring frames, may be referred to as major disposable frames.

Multipath routing is a routing algorithm that utilizes more than one path through a network. One of the paths may be selected because it is the fastest path, the path with lowest latency, the path that can carry the most bandwidth, the most suitable path, or the default path. When more paths are available, or when a new path becomes available, the new path may be tested before substantial portions of the media are moved to the new path. The following examples test the new path using portions of the media stream that will cause little disruption to the media stream if the frames are lost. The paths may be tested using interframes (e.g., all disposable frames or any combination of fully disposable frames, major disposable frames, and minor disposable frames). The frames may be made up of data packets, which may be referred to similarly as disposable packets, fully disposable packets, major disposable packets, and minor disposable packets.

As audio stream may also include disposable packets. Some audio codecs include multiple layers with at least one layer being disposable in that portions of the layer may be lost without disrupting the primary channel of the audio. Example audio codecs with disposable packets include True HD and DTS-HD. The disposable layer may be an enhancement layer including supplemental features or metadata.

FIG. 1 illustrates an example system for testing a new path in multipath communication. The system includes endpoint 101a, endpoint 101b, and a server 103. The endpoint 101a is coupled to the server 103 through multiple communication paths 102. The different communication paths may utilize different networks that use different or the same communication protocols. The endpoint 101b is coupled to the server 103 through one or more communication paths. Additional, different, or fewer components may be included in the system.

A multipath communication protocol provides for parallel and simultaneous communication on multiple communication paths (e.g., communication paths 102) and, optionally, multiple types of communication. Multiple paths provide more bandwidth than a single path so that more data can be transmitted. Example types of communication include Wi-Fi (e.g., the family of protocols known as IEEE 802.11), Ethernet (e.g., IEEE 802.3), cellular, Bluetooth, universal serial bus (USB), or other modes of data communication. As two or more of these types of communication transmit data in parallel for a communication session, performance of the communication session is improved.

Example multipath communication protocols include multipath transmission control protocol (TCP), multipath stream control transmission protocol (SCTP), and multipath real-time transport protocol (RTP). MPTCP may be defined by Request for Comments (RFC) 6182 as published March 2011 and available at http://tools.ietf.org/html/rfc6182 and/or RFC 6824 as published October 2013 and available at http://tools.ietf.org/html/draft-ietf-mptcp-rfc6824bis-00. MPTCP is a modified version of TCP that implements a multipath transport and achieves these goals by pooling multiple paths within a transport connection, transparently to the application. Multipath SCTP may be defined by "Load Sharing for the Stream Control Transmission Protocol (SCTP)," published March 2013 and available at http://tools.ietf.org/html/draft-tuexen-tsvwg-sctp-multipath. Multipath RTP, which utilizes multiple paths for a control channel for real-time content, may be defined by the draft "draft-singh-avtcore-mprtp-06" published January 2013 and available at http://tools.ietf.org/html/draft-singh-avtcore-mprtp-06 and/or draft "draft-singh-avtcore-mprtp-07" and available at http://tools.ietf.org/html/draft-singh-avtcore-mprtp-07. In addition, other communication protocols may be adapted for multipath communication.

The endpoint 101a may select an initial or primary communication path for communication with the server 103. It is not always straightforward which of the communication paths 102 is the fastest and most suitable to transport media. Sometimes the performance of a communication paths travels as a function of time or as a function of location. Sometimes different communication paths are preferable based on cost. The initial or primary communication path may be a default path selected by the user or a predefined setting. In the example of multipath RTP, receiver report packets may be generated and returned by the receivers of the media packets including network statistics of the performance of the path or subflow. The initial or primary communication path may be selected based on the receiver report packets.

The user or a manufacturer may define an order of preference for selecting the primary communication path. For example, the order of preferences may be the sequence of Wi-Fi first, then cellular, and then any other available communication path. In another example, the order of preference may include multiple Wi-Fi communication paths in order of signal strength, order of longest known by the endpoint 101a (the network that the endpoint 101a connected to first or was configured to connect to first), or alphabetical order. The order of preferences for multiple Wi-Fi communication paths may be defined by the user as the user manually connects to networks.

The endpoint 101a connects to the server 103 or another destination (e.g., endpoint 101b) through the server 103 through the primary path and sends a data stream using the primary path. The data stream may be transmitted through the primary path for any amount of time until the endpoint 101a is triggered to search for an additional communication path. The trigger may be based on a predetermined amount of elapsed time (e.g., 10 seconds, 1 minute, or 5 minutes), a predetermined amount of transferred data (e.g., 1 kilobyte, 1 megabyte, or 10 megabytes), or a user command to search for additional communication paths.

In order to test the potential additional communication path, the endpoint 101a may establish a temporary connection using the alternative communication path and send a disposable packet of the data stream using the alternative communication path to the destination (e.g., endpoint 101b). The disposable packet may be a frame of video or a portion of an audio layer that can be dropped or deleted without significantly affecting the data stream. An example change that does not significantly affect the data stream would be a change in frame rate that is not noticeable to the human eye (e.g., drop from 30 frames per second to 29 frames per second). An example type of disposable packet includes data for a redundant frame that includes only data that has been sent in other frames. Alternately, the redundant frame may include only data that has been sent in other frames or will be sent in subsequent frames of the data stream. An example type of disposable packet may include data for interframes that describe changes of objects in the image from previous frames and/or future frames.

In response, the endpoint 101a receives a transmission parameter for the disposable frame of the data stream and the alternative path. Examples for the transmission parameter describing transmission performance may include a bandwidth value, a latency value, a packet drop value, a round trip time value, or another quality value. The transmission parameter may be an indication that the packets or frame arrived at the destination (e.g., acknowledgement message). The bandwidth value may describe the bandwidth of the alternate communication path. The latency value may describe an amount of time for disposable packets to arrive at the endpoint 101b. The packet drop value may indicate whether all or a predetermined percentage of the disposable packets were received at the endpoint 101b. In one embodiment, the round trip time value may describe the total time for the disposable packet to reach the endpoint 101b and the transmission parameter to be returned to the endpoint 101a.

In another embodiment, the transmission parameter may be generated at the endpoint 101a based on a response received from the endpoint 101b. The transmission parameter may be generated at the server 103 based on monitoring the communications between the endpoints 101a and 101b. The transmission parameter may be generated at the endpoint 101b based on the one-way performance of the communication path and sent back to the endpoint 101a. Either endpoint 101a or the server 103 may analyze the transmission parameter to determine if portions of the data stream should be sent over the alternative communication path.

When the transmission parameter indicates that the alternative communication path is adequate for transporting media, the endpoint 101a may establish a permanent or semi-permanent communication path using the alternative communication path and any of the multipath communication protocols described herein or another communication protocol. A semi-permanent communication path may be a communication path that stays active long enough to transmit a predetermined portion of a media stream.

In one alternative, the data stream may include multiple video streams multiplexed together, for example using the techniques described in "Negotiating Media Multiplexing Using the Session Description Protocol" as published April 2014 and available at http://tools.ietf.org/html/draft-ietf-mmusic-sdp-bundle-negotiation-07. In this example, the data stream may include one audio and two video streams (e.g., main video and presentation) on the same data stream. One of the video streams, in part or in its entirety, may comprise disposable frames or disposable packets for testing an alternative path for the data stream.

The endpoint devices 101a-b may be any combination of a laptop computer, a mobile phone, a smart phone, a tablet computer, or any computing device with multiple communication interfaces, which may also include virtual interfaces. The endpoints 101a-b may be connected to the server 103 through intermediate or proxy devices.

Figure 2:
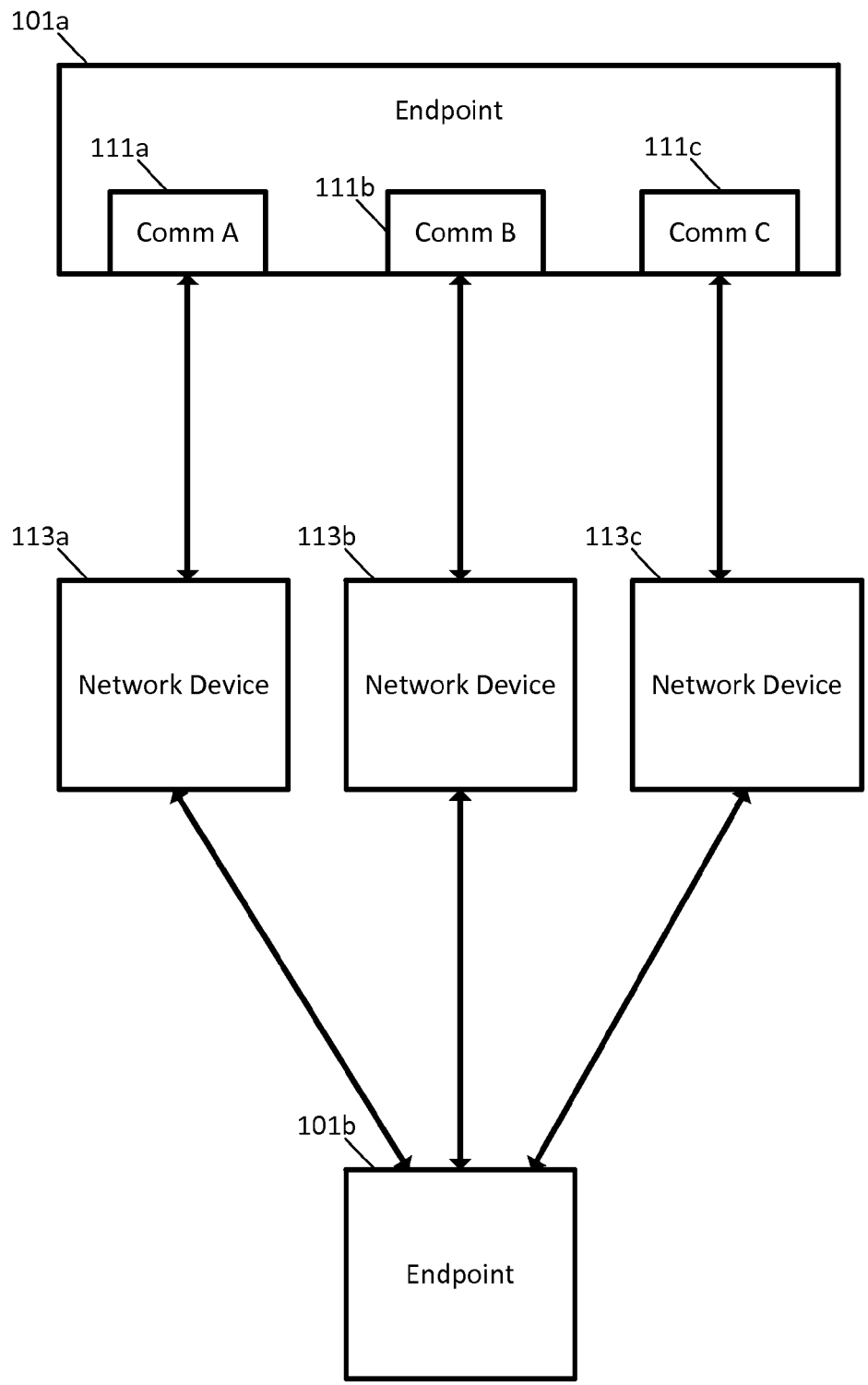
FIG. 2 illustrates an example multipath communication.

FIG. 2 illustrates an example multipath communication between endpoint 101a and endpoint 101b through three network devices 113a-c. The endpoint 101a may include multiple network interfaces 111a-c. Each of the network interfaces 111a-c may be configured for a different type of communication. Any number of interfaces may be included.

The network interface 111a and network device 113a are configured to use a first communication network or protocol, the network interface 111b and network device 113b are configured to use a second communication network or protocol, and the third network interface 111c and network device 113c.

One of the communication networks may be a cellular telephone network that utilizes one or more of the analog advanced mobile phone system (AMPS), the global system for mobile communication (GSM), third generation partnership project (3GPP), code division multiple access (CDMA), personal handy-phone system (PHS), and 4G or long term evolution (LTE) standards. For example, the network device 113a may be a cellular tower, a base station, or a data switch for connecting the cellular network to the internet.

One of the communication networks may be a local internet connection provided by the family of protocols referred to as IEEE 802.11, the family of protocols referred to as Bluetooth or a wired connection (e.g., the IEEE 802.3 family). The network device 113b may be a wireless router or a server in the local network. One of the communication networks may be a satellite internet connection, a microwave internet connection, or an Ethernet over power line network. The network device 113c may be a satellite or associated router, a microwave tower or associated router, or a demodulation device in the Ethernet over power line network.

Two or more of the connections may be the same type of connection. For example, the network devices 113a and 113b may both be wireless routers. The endpoint 101a may be in range of multiple wireless networks. Example scenarios include wireless networks of multiple business or residences accessible from a single location. While at a restaurant, an endpoint device may be able to connect to the restaurant's wireless network as well as a nearby business's wireless network. While at home, a user may connect an endpoint to the user's wireless network and the wireless network of the user's neighbor. In another scenario, one of the connections may be established through a "visitor" network. In these so-called "bring your own device" networks, users may bring an unrecognized laptop, tablet, smartphone, or other device to connect to the visitor network and also gain access to the enterprise network with an authenticated login and password.

More than one of the network interfaces 111a-c may connect to the same network device using multiple protocols. For example, network interface 111a may be used for internet protocol version 4 (IPv4) and network interface 111b may be used for internet protocol version 6 (IPv6). The network interfaces 111a and 111b may be a dual stack or dual interfaces of a single communication interface that has two different communication paths connected (e.g., a single interface connected to both IPv4 and IPv6). In another example, one of the network interfaces may connect the endpoint 101a to a virtual private network. Thus, one communication path is through the local network and another communication path is through the virtual private network. The virtual private network may appear as a "software" network interface on the endpoint and packets send on the virtual private network interface are tunneled and encrypted towards a VPN terminating gateway as another communication path to the destination.

Figure 3:
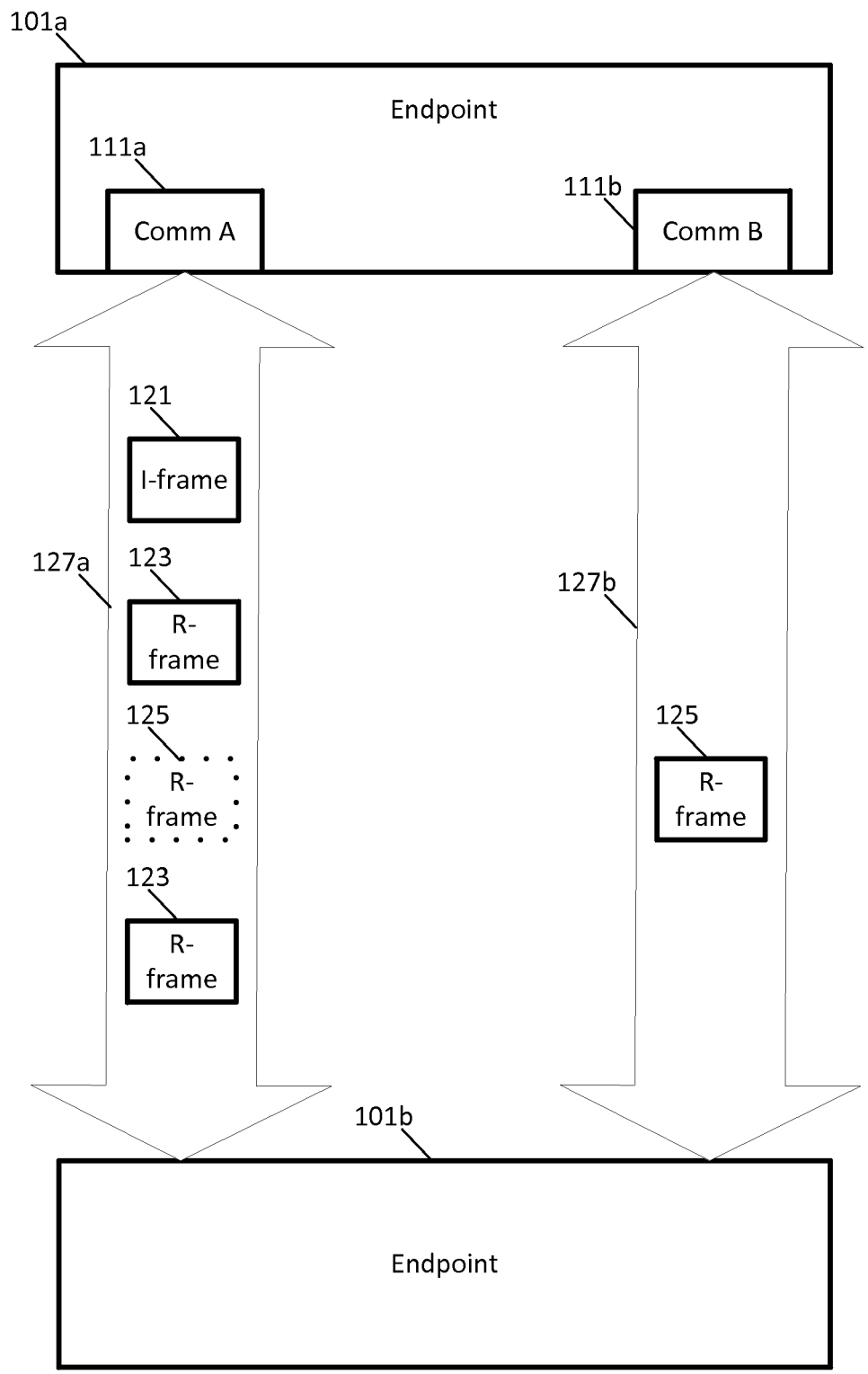
FIG. 3 illustrates a redundant frame on a new path in multipath communication.

FIG. 3 illustrates a redundant frame on a new path in multipath communication. In the embodiment of Figure, endpoint 101a includes a first network interface 111a to connect to the endpoint 101b through a communication path 127a, and a second network interface 111b to connect to the endpoint 101b through a communication path 127b.

A media stream carried by the communication path 127a includes at least one intraframe 121 and at least one redundant frame (R-frame) 123. The frames include macroblocks of sampled image data (e.g., discrete cosine transforms). The intraframe 121 includes only intra macroblocks, and the R-frames include intra macroblocks or predicted macroblocks. Example R-frames include B-frames and P-frames. P-frames utilize data from previous frames to describe image data. B-frames utilize data from previous frames and subsequent frames to describe image data. The intraframes 121 may achieve no compression or low compression. P-frames may achieve a higher level of compression, and B-frames may achieve an even higher level of compression.

Multiple redundant frames are illustrated in FIG. 3. At least one of the R-frames 125 (shown by the dotted lines) is identified to test the communication path 127b. The identified frame 125 is sent using the communication path 127b. In one example, the endpoint 101a records a first timestamp for the transmission of the frame 125 and endpoint 101b records a second timestamp if and when the frame 125 is received. The endpoint 101b may send the second timestamp to the endpoint 101a through communication path 127a even though communication path 127b was used for the transmission of the frame 125, and the endpoint 101a may calculate the speed of the frame 125 based on the first time stamp and the second timestamp. In another example, the endpoint 101b may sent an acknowledgement message back to the endpoint 101a, and the endpoint 101a may calculate a round trip time based on the first timestamp and the receipt of the acknowledgement message.

The endpoint 101a may compare the round trip time or another transmission parameter to a threshold value. The threshold value may be a static setting set by the user or default to the endpoint 101a. Example threshold values include 100 milliseconds to 1 second or other values. The threshold value may be set as a function of the existing communication path 127a. If the media stream is being transmitted over communication path 127a, the threshold for communication path 127a may be set to a rated percentage of the performance of communication path 127a. For example, if the roundtrip time for communication path 127a is 200 milliseconds and the rated percentage is 150%, then the threshold for accepting a new alternative path (e.g., communication path 127b) is 300 milliseconds (150% of 200 milliseconds).

The transmission parameter may include multiple tested parameters. The endpoint 101a may compare the multiple tested parameters to different threshold values for the bandwidth, latency, packet drops, and round trip time. Any combination of these parameters may be used by the endpoint 101a to determine whether portions of the media stream will be transmitted over the alternative path.

The endpoint 101a may calculate a difference between the threshold value and the measured transmission value or a difference between the transmission parameters of the two or more communication paths. The portion of the media stream that is moved to the alternative path may be a function of the difference. For example, if the transmission parameter is marginally better than the threshold a small portion of the media stream is moved to the alternative path. The portion of the media stream that is moved to the alternative path may be proportional to the difference between the threshold value and the measured transmission value or a difference between the transmission parameters of the two or more communication paths. Alternatively, a lookup table may associate transmission parameter values with amounts of the media stream to be moved to the alternative path.

Another example of disposable packets or disposable frames is included in multiple layer encoding. The media stream may include multiple substreams. For example, one substream may include a standard definition resolution and a high definition resolution. When the receiving endpoint is using the standard resolution, the extra image data or macroblocks for the high definition substream are unnecessary, and may be used as disposable frames for testing an alternative communication path. The high definition layers may be supplemental features of the data stream.

Likewise, when the receiving endpoint is using high definition resolution, some of the frames may be labeled as disposable because loss of the frames would result in the receiving endpoint reverting to standard resolution rather than causing any significant disruption in the media stream. Other alternative resolutions or types of substreams may be used.

Another example of disposable packets or disposable frames is included scalable video coding (SVC). A SVC video stream may include a base layer and one or more enhancement layers. The base layer may include a lowest spatial or lowest quality representation of the video stream. The enhancement layer may include a higher spatial or higher quality representation of the video stream. Multiple enhancement layers may include varying spatial levels or varying quality levels. One or more data packets for the enhancement layers may be disposable frames used to test an alternative path. If one or more data packets for the enhancement layers are dropped, at worst, the receiving endpoint would automatically revert to the resolution and quality of the base layer based on SVC. In one example, the sending endpoint (e.g., endpoint 101a) may use packets from a potential enhancement layer even when the bandwidth (e.g., via only the primary path) is too low to support the enhancement layer.

Packets or frames for the base layer and the enhancement layer may be identified by a relative priority value (e.g., a numeric value from 1 to 4 or 1 to 16 that is indicative of the layer). The codec executed by endpoint 101a may access the relative priority value to identify whether the packet or frame belongs to a base layer or a particular enhancement layer. Thus, the endpoint 101a may define a disposable frame based on the relative priority value. SVC may be implemented according to the standard Annex G extension of Version 9 of the H.264/MPEG-4 AVC video compression standard implemented in February 2014 and available at http://www.itu.int/ITU-T/recommendations/rec.aspx?rec=6312.

Another example of disposable packets or disposable frames is included in high efficiency video coding (HEVC) video compression standards (e.g., H.265, 4K standards, or 8K standards) in which the receiving endpoint can rebuild lost packets based on other frames. Alternatively, the disposable frames may be interframes from VP9 encoding. VP9 inter frames may use varying resolutions. Each inter frame may be encoding using a different resolution than the previous frame. The inter frames may be scaled when predicting subsequent frames. Other encoding formats are possible.

In another example, the disposable frames may be frames in excess of a minimum frame rate. For example, when the minimum frame rate is 24 frames per second, any additional frames may be considered disposable frames. If the media stream is 30 frames per seconds, 6 of the frames may be labeled as disposable frames. The disposable frames may be spaced apart (e.g., the disposable frames may be the $7^{th}$ frame, the $13^{th}$ frame, and so on).

Another example of disposable frames may be empty frames. For example, when a video frame includes a blank screen or few objects, the video frame may be an empty frame. The endpoint 101a may compare pixel values in the video frame to determine whether set percentages (e.g., 90%) of the pixel values are equivalent. Another example of empty frames may occur when the media stream is paused.

Figure 4:
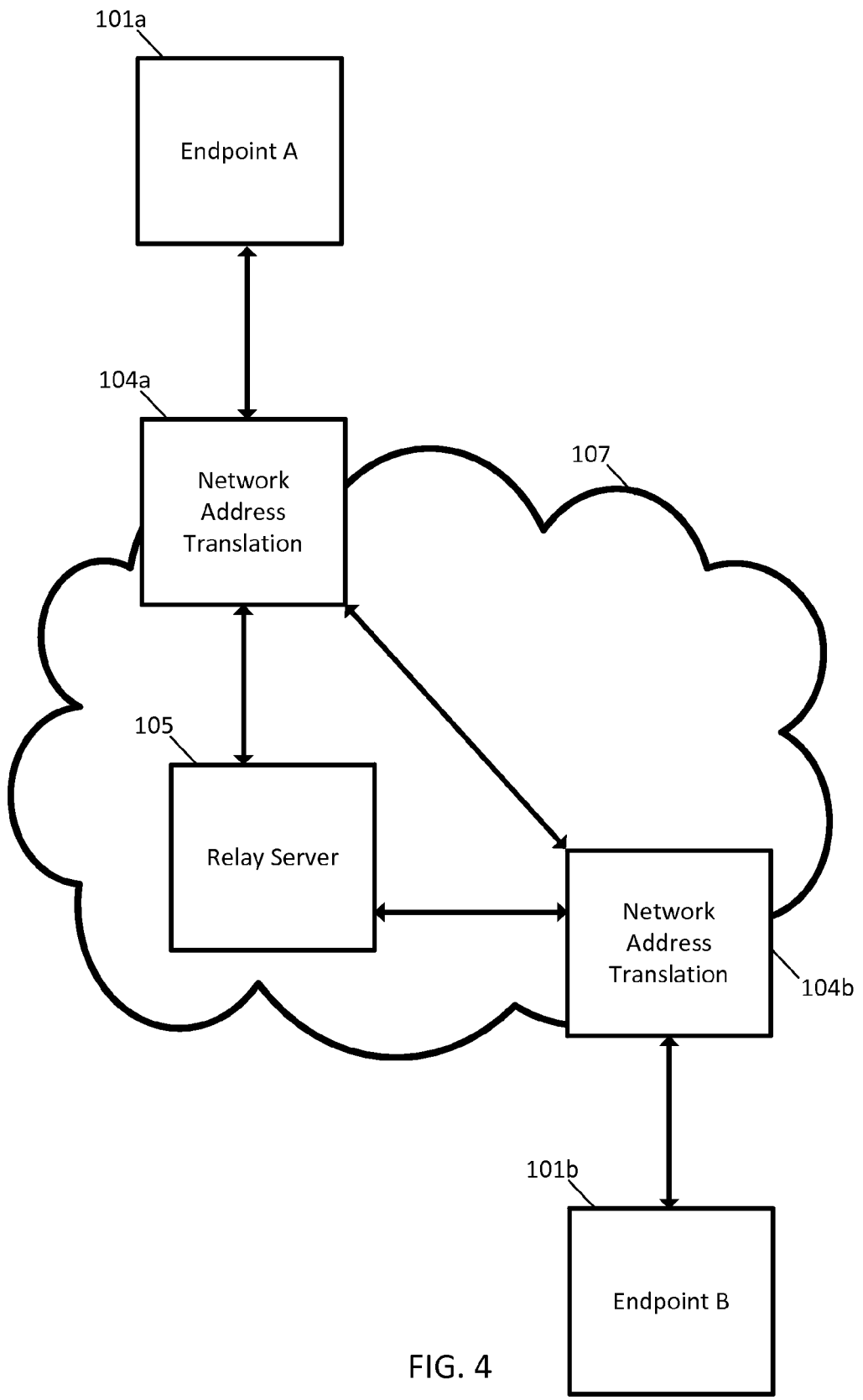
FIG. 4 illustrates another example system for testing a new path in multipath communication.

FIG. 4 illustrates another example system for testing a new path in multipath communication. The system includes endpoint 101a and endpoint 101b coupled by a network 107. The endpoints may communicate using multiple paths through the network 107. In one example, the network includes a local network address translation (NAT) device 104a, a remote NAT device 104b, and a relay server 105 (e.g. traversal using relays around NAT (TURN) server). The endpoints 101a and endpoint 101b may be in communication through multiple paths that are identified using the interactive connectivity establishment (ICE) during call setup. The multiple connections may include a direct or host server connection directly between endpoint 101a and 101b, a NAT connection between NAT device 104a and NAT device 104b, and a TURN relay connection through the relay or TURN server 105. Additional, different, or fewer components may be used.

In order to establish the TURN relay connection, the endpoint 101a may send a TURN packet or request to the turn server 105 through the NAT device 104a asking for the relay or TURN server 105 to open up a relay port to the endpoint 101b. The endpoint 101b may send a TURN packet or request to the relay or TURN server 105 through the NAT device 104b asking for the relay or TURN server 105 to open up a relay port to the endpoint 101a. The relay or TURN server 105 builds a forwarding table based on the request and the endpoints 101*a* and 101*b* may communicate with one another by sending packets to the relay or TURN server 105.

In order to establish the NAT connection, the NAT devices 104*a* and 104*b* assign public side internet protocol addresses to packets sent by the endpoints 101*a* and 101*b*, which are translated back to local IP address when the packets are received on the remote side. To establish a direct connection between endpoints 101*a* and 101*b* through both NAT devices 104*a* and 104*b*, the ICE procedure orchestrates the order the initial packets are sent. The ICE mechanism sends connectivity checks from both endpoints to open up "pinholes" in the corresponding NAT devices 104*a* and 104*b*. If the pinholes were successfully created, the endpoints can now communicate directly without the need of sending the packets through a relay service or TURN.

The ICE technique may be used to discover the multiple communication paths. ICE builds a checklist containing candidate pairs. A candidate is a specific IP address and port where the endpoint can receive data. If an endpoint has multiple interfaces with different IP addresses associated with the multiple interfaces, the endpoint has several host candidates. ICE may also include relay candidates obtained by sending a request to a TURN server. The TURN server will allocate a public IP and port the endpoint can use to receive data. While communicating with the TURN server it is also possible to learn what IP address and port the NAT have assigned to flow. This is called a reflexive candidate. Each interface can have a set of host candidates associated with the interface, and each of the host candidates may also have a corresponding reflexive and relay candidates.

Pairing up all the remote candidates with all the local candidates forms the ICE checklist. This is done so it is possible for example to test if a local host candidate can send date to the remote host, reflexive or relay candidate. The same is done with the local relay address. And all the other candidates associated with the different interfaces. All the pairs in the checklist are checked by sending a connectivity check. If that is successful that candidate pair is moved to the valid list. Once the ICE procedure is completed, the valid list contains a list of all the possible communication paths.

After the multiple paths are negotiated using ICE, the endpoints 101*a* and 101*b* may determine which of the paths or links should be used to initially transport media. The endpoints may determine the round trip time or latency of the paths and select the fastest path. The round trip times may be measured as part of the connectivity checks during the ICE setup phase.

Either or both of the endpoints 101*a* and 101*b* may test other paths in addition to the initial path by directing one or more disposable video frames over an alternative path. The initial path may be the fastest of the direction connection, the NAT device connection, and the TURN relay connection. The round trip times of the tested paths may be determined using the disposable video frames. The round trip times of the test paths may be compared to that of the initial paths or to a minimum speed value or minimum latency value. When the speed of the test paths is greater or equal to the initial path, exceeds the minimum speed value, or otherwise could help the overall speed of the video frames, at least part of the video frames, including both disposable and non-disposable frames, is allocation to the new path.

The testing and allocation may be repeated. Path performance changes as the endpoint 101*a* and/or endpoint 101*b* change location. Path performance may change as a function of network load or time of day. The initial path may be removed from the transmission. Additional alternative paths may be added to the transmission. Proportional amounts of the video frames allocated to each path may be updated periodically.

Figure 5:
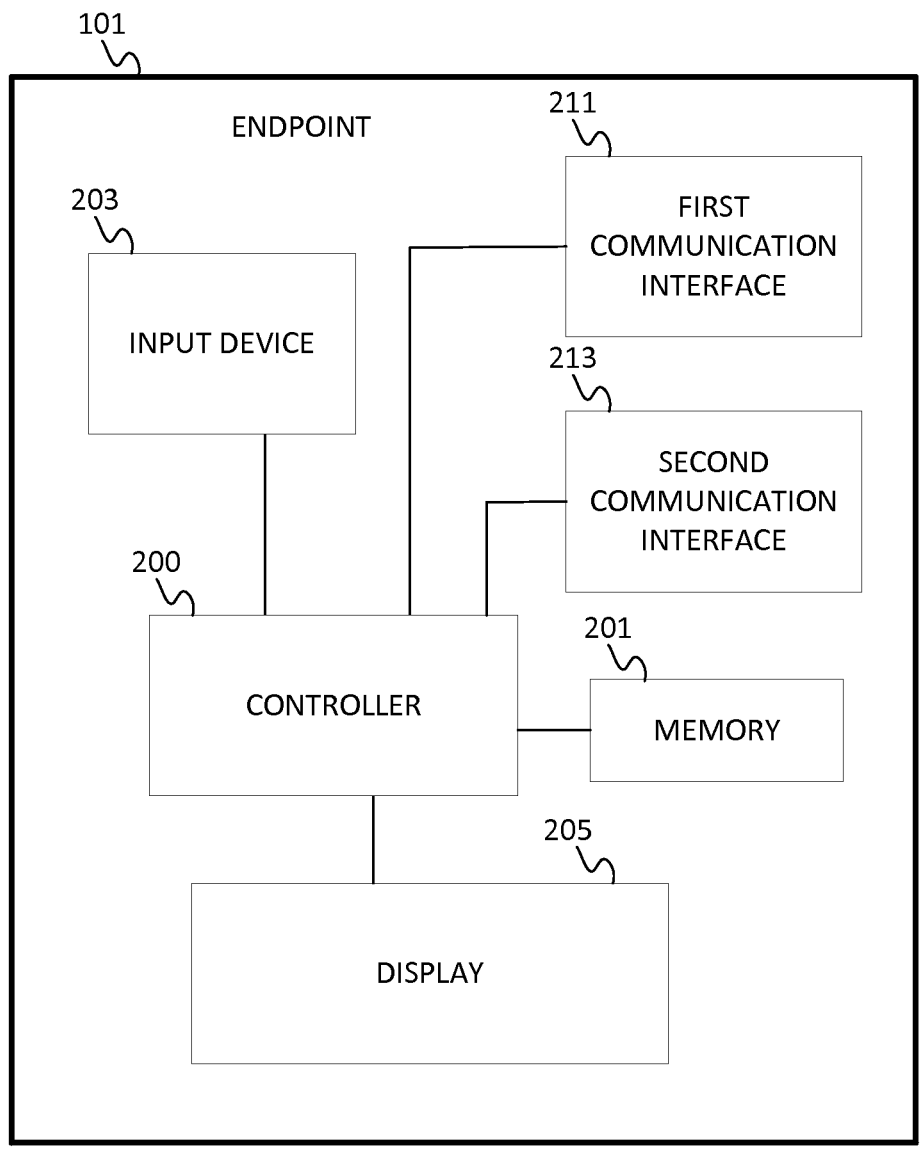
FIG. 5 illustrate an example endpoint from the systems of FIGS. 1-4.

FIG. 5 illustrates an example endpoint device 101 for the systems of FIG. 1-4. The endpoint device 101 includes a controller 200, a memory 201, an input device 203, a first communication interface 211, a second communication interface 213, and a display 205. The first communication interface 211 is configured to establish a first communication path to a destination, and the second communication interface 213 is configured to establish a second communication path to the destination. Additional, different, or fewer components may be provided. Different network devices may have the same or different arrangement of components.

Figure 6:
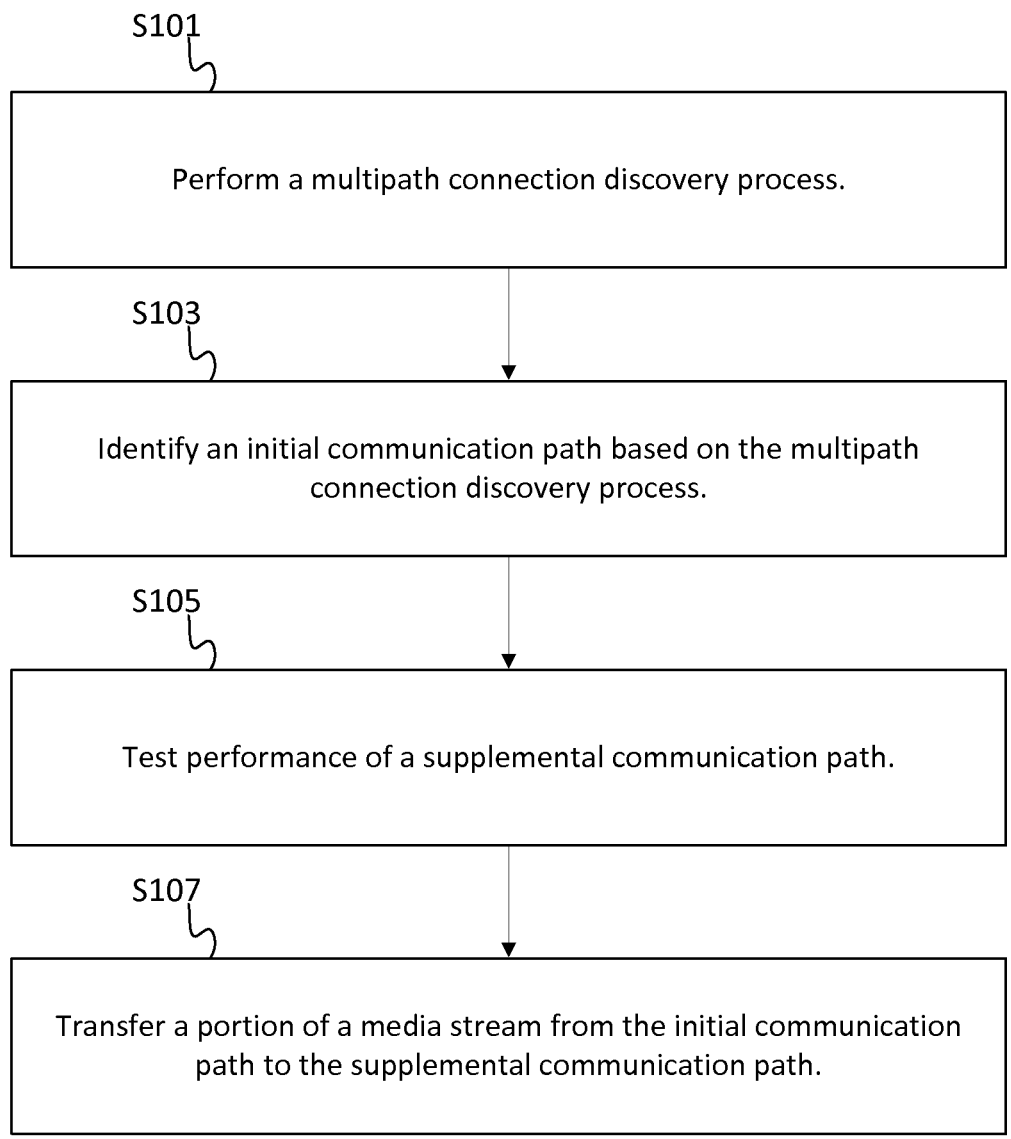
FIG. 6 illustrates an example flowchart for the operation of the endpoint of FIG. 5.

FIG. 6 illustrates an example flowchart for multipath communication and alternative path testing by the endpoint device 101 of FIG. 5. Additional, different, or fewer acts may be provided. The acts are performed in the order shown or other orders. The acts may also be repeated.

At act S101, the controller 200 may perform a multipath connection discovery process. The controller 200 may poll connected interfaces including the first communication interface 211 and the second communication interface 213 for live connections.

At act S103, the controller 200 identifies an initial communication path (e.g., communication interface 211) based on the multipath connection discovery process. The initial path may be selected according to a predetermined hierarchy that specifies an order to select the initial path from available paths. The initial path may be selected based on costs or current costs (e.g., Wi-Fi selected over cellular). The controller 200 sends a media stream over the initial communication path. The media stream may include audio, video, or both audio and video. The communication paths may include wired connections, wireless connections, cellular connections, or any of the communication techniques described herein.

At act S105, the controller 200 tests the performance of one or more supplemental communication paths (e.g., communication interface 213). The controller 200 may extract one or more disposable frame from the media stream transmitting over the initial communication path to test communication over the supplemental communication paths. Each of the one or more disposable frames may include an identifier field including data that identifies the frame as a disposable frame.

The disposable frame may be a non-unique frame that includes only changes from a previous frame in the media stream. The loss of a disposable frame causes less visible artifacts or other disruptions to the media stream than the loss of a unique frame. The disposable frame may be a frame, which if dropped or corrupted, would not cause video artifacts such as blinking, flickering, scrambled pictures, or black spots in the media stream.

Either the initial communication path or the supplemental communication path may be used to report the receipt of the disposable frame. Based on the time, the controller 200 may generate a performance report for the supplemental path. The performance report may describe the latency or round trip time of the supplemental path.

Multiple disposable frames may be used to test the supplemental communication paths. For example, a predetermined number of disposable frames at time increments may be transmitted using the supplemental communication path. The performance of the supplemental path may be average or otherwise statistically combined in the performance report.

At act S107, the controller 200 transfers a portion of a media stream from the initial communication path to the supplemental communication path. The processor is configured to compare data in the performance report to a minimum performance value and transfer the portion of the media stream to the supplemental communication path when the performance data exceeds the threshold value.

When the data in the performance report does not meet the minimum performance value, the controller 200 may start a timer in response to the comparison, and send a second disposable frame of the media stream using the supplemental path in response to the timer reaching a predetermined value. For example, the controller may repeat acts S105 and S107 using another disposable frame.

The input device 203 may receive user inputs for selecting the initial communication path or for setting the minimum performance value for selecting supplemental paths. The display 205 may present textual or graphical illustrations of the available communications paths, the selected initial communication paths, and the supplemental communication path. The display 205 may also include data indicative of the performance of the communication paths and the proportion of the media stream that is allocated to the available communication paths.

The input device 203 may be one or more buttons, keypad, keyboard, mouse, stylus pen, trackball, rocker switch, touch pad, voice recognition circuit, or other device or component for inputting data to the mobile device 101. The input device 203 and the display 205 may be combined as a touch screen, which may be capacitive or resistive. The display 205 may be a liquid crystal display (LCD) panel, light emitting diode (LED) screen, thin film transistor screen, or another type of display.

Figure 7:
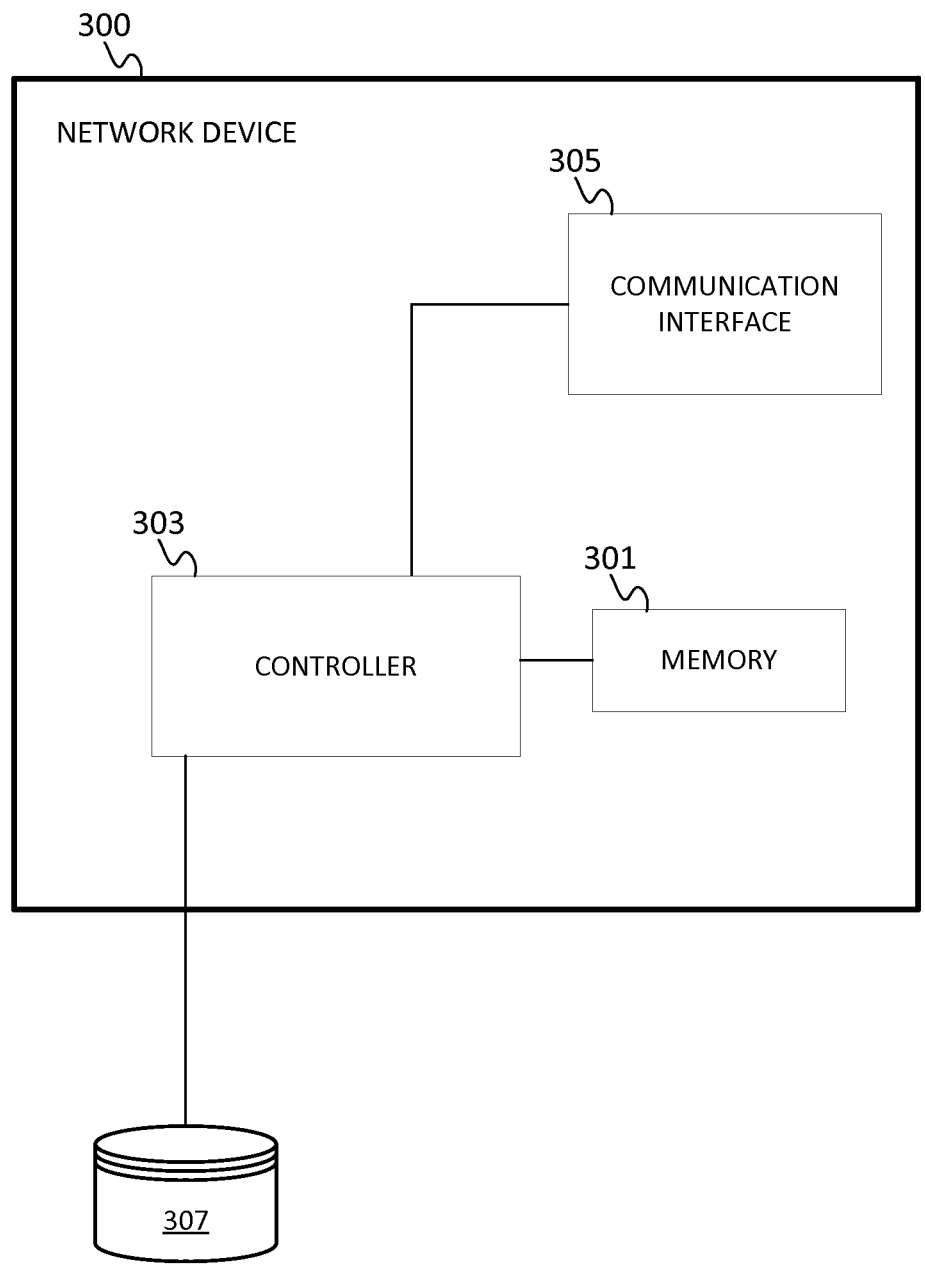
FIG. 7 illustrates an example network device from the system of FIGS. 1-4.

FIG. 7 illustrates an example network device 300 for the systems of FIG. 1-4. The network device 300 may correspond to the server 103 or the network device 113a-c. The network device 300 includes at least a memory 301, a controller 303, and a communication interface 305. In one example, a database 307 stores a log of timestamps and source addresses for disposable frames received from the endpoints 101. Additional, different, or fewer components may be provided. Different network devices may have the same or different arrangement of components.

Figure 8:
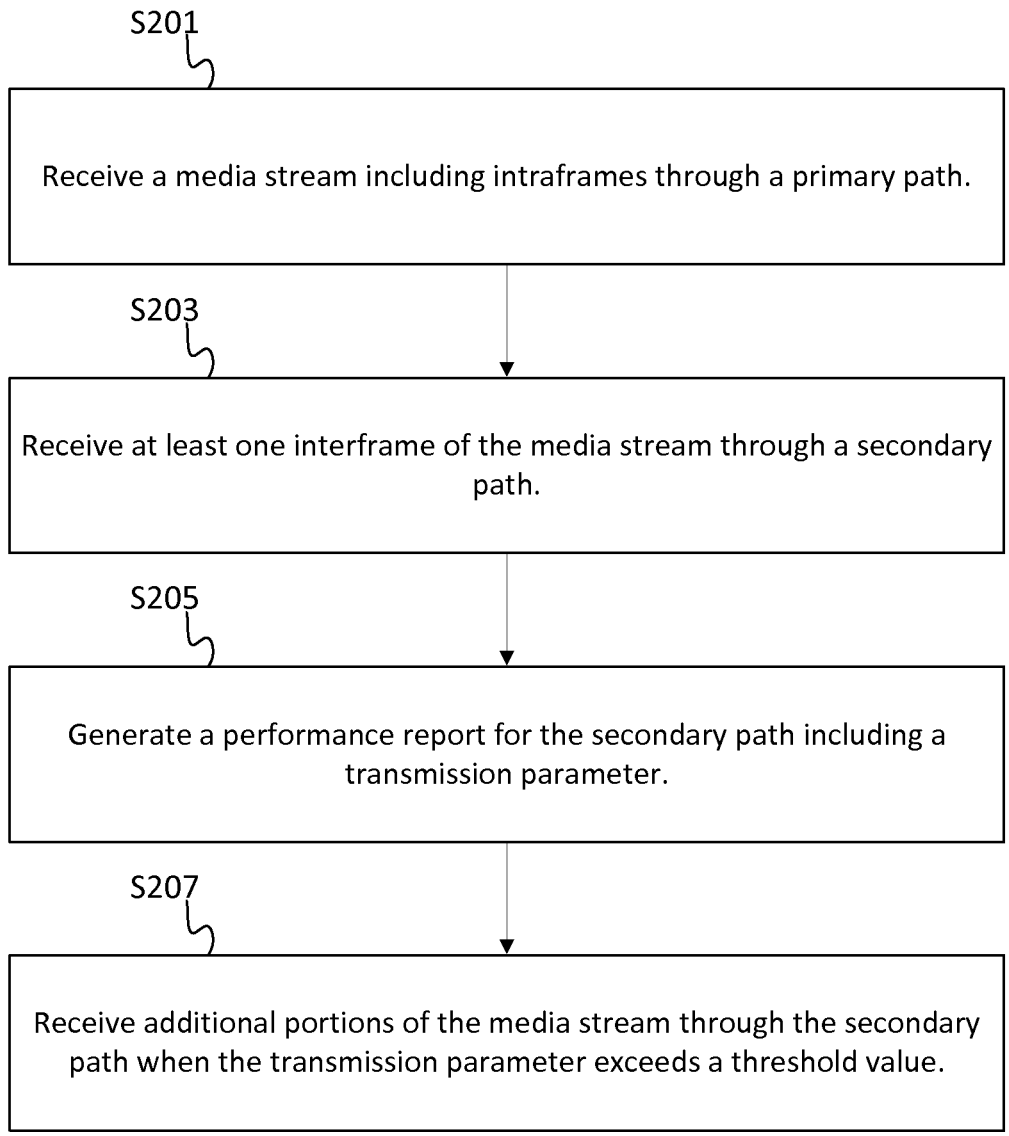
FIG. 8 illustrates an example flowchart for operation of the network device of FIG. 7.

FIG. 8 illustrates an example flowchart for multipath communication and identification of supplemental paths using disposable frames using the network device 300 of FIG. 7 (e.g., server 103). Additional, different, or fewer acts may be provided. The acts are performed in the order shown or other orders. The acts may also be repeated.

At act S201, the controller 303 or the communication interface 305 receives a media stream including intraframes through a primary path. The primary path may be the first connection successfully completed to the network device 300. The primary path may be a known network that has previously established a connection between the endpoint 101a and the network device 300. The primary path may be the user's wired network, wireless network, or cellular network.

At act S203, the controller 303 or the communication interface 305 receives at least one interframe of the media stream through a secondary path. The secondary path may be a new network. The secondary path may be a wireless connection and a business (e.g., at a restaurant, doctor's office or shopping mall). The secondary path may be another path on the known network. The additional path may use an additional protocol (e.g., IPv6 versus IPv4, TURN relay versus NAT translation).

At act S205, the controller 303 generates a performance report for the secondary path, wherein the performance report include a transmission parameter based on the at least one interframe. The transmission parameter includes of a bandwidth value, a latency value, a packet drop value, a round trip time value, or another quality value. The transmission parameter may be selected based on a quality of service (QoS) selection by the user. The performance report may include statistics for multiple interframes that each include redundant image data. The performance of the interframes may be report individually or statistically (e.g., mean and standard deviation).

At act S207, the controller 303 or the communication interface 305 receives additional portions of the media stream through the secondary path when the transmission parameter exceeds a threshold value. The controller 303 may send the performance report to the endpoint 101, and the endpoint 101 may compare the transmission parameter to the threshold value and re-allocate the media stream. Alternatively, the controller 303 may signal the endpoint 101a to move part of the media stream from the primary path to the secondary path using any of the multipath protocols described herein. The size of the part of the media stream that is moved may be a function of the performance report. The size of the part of the media stream that is moved may be adjusted over time.

The controllers 200 and 303 may include a general processor, digital signal processor, an application specific integrated circuit (ASIC), field programmable gate array (FPGA), analog circuit, digital circuit, combinations thereof, or other now known or later developed processor. The controllers 200 and 303 may be a single device or combinations of devices, such as associated with a network, distributed processing, or cloud computing.

The memories 201 and 301 may be a volatile memory or a non-volatile memory. The memories 201 and 301 may include one or more of a read only memory (ROM), random access memory (RAM), a flash memory, an electronic erasable program read only memory (EEPROM), or other type of memory. The memories 201 and 301 may be removable from the network device 300, such as a secure digital (SD) memory card.

The network may include wired networks, wireless networks, or combinations thereof. The wireless network may be a cellular telephone network, an 802.11, 802.16, 802.20, or WiMax network. Further, the network may be a public network, such as the Internet, a private network, such as an intranet, or combinations thereof, and may utilize a variety of networking protocols now available or later developed including, but not limited to TCP/IP based networking protocols.

While the computer-readable medium may be shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, example embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. The computer-readable medium may be non-transitory, which includes all tangible computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

I claim:

1. A method comprising:
   connecting, using a processor, to a destination through a primary path;
   sending a data stream including intraframes using the primary path and a first type of communication;
   connecting, using the processor, to the destination through an alternative path and a second type of communication;
   sending a disposable packet for a interframe of the data stream using the alternative path;
   receiving a transmission parameter for the disposable packet of the data stream and the alternative path;
   performing a comparison of the transmission parameter of the disposable packet to a threshold value;
   in response to the transmission parameter exceeding the threshold value, starting a timer; and
   in response to the timer reaching a predetermined value, moving a portion of the data stream including the intraframes from the primary path using the first type of communication to the alternative path using the second type of communication.

2. The method of claim 1, wherein the transmission parameter includes one or more of a bandwidth value, a latency value, a packet drop value, a round trip time value, or another quality value.

3. The method of claim 2, wherein the transmission parameter includes any combination of two or more of the bandwidth value, the latency value, the packet drop value, and the round trip time value, the method further comprising:
   performing a comparison of the two or more transmission parameters of the disposable frame to two or more threshold values.

4. A method comprising:
   connecting, using a processor, to a destination through a primary path;
   sending a data stream using the primary path;
   connecting, using the processor, to the destination through an alternative path;
   sending a disposable packet of the data stream using the alternative path; and
   receiving a transmission parameter for the disposable packet of the data stream and the alternative path;
   performing a comparison of the transmission parameter of the disposable packet to a threshold value;
   when the threshold value exceeds the transmission parameter, starting a timer in response to the comparison; and
   sending a second disposable frame of the data stream using the alternative path in response to the timer reaching a predetermined value.

5. The method of claim 4, wherein the disposable packet is a disposable frame and the data stream is a media stream including the disposable frame.

6. The method of claim 5, wherein the disposable frame is a redundant frame in a series of frames in the media stream, where image data of the redundant frame is included in one or more other frames in the series of frames.

7. The method of claim 5, wherein the disposable frame is an interframe that describes changes from one or more other frames in the series of frames.

8. The method of claim 5, wherein the disposable frame is an interframe that describes changes from a preceding frame in the series of frames and a subsequent frame in the series of frames.

9. The method of claim 5, wherein the disposable frame includes data for an alternative resolution of the media stream.

10. An apparatus comprising:
    a first communication interface configured to establish a first communication path to a destination;
    a second communication interface configured to establish a second communication path to the destination; and
    a processor configured to send a media stream over the first communication path and extract a first disposable frame from the media stream to test communication over the second communication path,
    wherein the processor performs a comparison of the transmission parameter of the disposable packet to a threshold value and when the threshold value exceeds the transmission parameter, the processor starts a timer and sends a second disposable frame of the data stream using the second communication path in response to the timer reaching a predetermined value.

11. The apparatus of claim 10, wherein the first disposable frame is at least partially defined by one or more other frames in the media stream.

12. The apparatus of claim 10, wherein the first disposable frame includes only changes from a previous frame in the media stream.

13. The apparatus of claim 10, wherein the first disposable frame includes data for a supplemental feature of the media stream.

14. The apparatus of claim 10, wherein the first communication interface or the second communication interface receives performance data that describes the transmission of the first disposable frame over the second communication path.

15. The apparatus of claim 14, wherein the processor is configured to compare the performance data to a threshold value and transfer a portion of the media stream to the second communication interface and the second communication path when the performance data exceeds the threshold value.

16. A non-transitory computer readable medium including instructions that when executed are configured to cause a processer to:

receive a media stream to a destination including intraframes through a primary path; receive at least one interframe of the media stream to the destination through a secondary path; generate a performance report for the secondary path, wherein the performance report includes a transmission parameter based on the at least one interframe;

perform a comparison of the transmission parameter of the at least one interframe to a threshold value; and receive additional portions of the media stream including intraframes through the secondary path when the transmission parameter for the at least one interframe exceeds the threshold value;

wherein when the threshold value exceeds the transmission parameter, and a timer is started in response to the comparison, receive a second interframe of the media stream using the secondary path in response to the timer reaching a predetermined value.

17. The non-transitory computer readable medium of claim 16, wherein the transmission parameter includes one or more of a bandwidth value, a latency value, a packet drop value, a round trip time value, or another quality value.

18. The non-transitory computer readable medium of claim 16, wherein the at least one interframe includes a plurality of interframes including redundant image data and the performance report includes statistics for the plurality of interframes.

\* \* \* \* \*